United States Patent [19]

Kuchar

[11] Patent Number: 5,487,703
[45] Date of Patent: Jan. 30, 1996

[54] STRAW WALKER FOR CHAFF REMOVAL IN A COMBINE

[76] Inventor: George J. Kuchar, P.O. Box 595, Carlinville, Ill. 62626

[21] Appl. No.: 193,266

[22] Filed: Feb. 8, 1994

[51] Int. Cl.$^6$ ..................................................... A01F 12/32
[52] U.S. Cl. ............................... 460/85; 460/96; 460/148
[58] Field of Search ................................. 460/85, 90, 91, 460/92, 93, 94, 95, 96, 108, 145, 146, 147, 148, 902

[56] References Cited

U.S. PATENT DOCUMENTS 5,021,029  6/1991  Usick ......................................... 460/85

FOREIGN PATENT DOCUMENTS 3907836  9/1990  Germany ................................. 460/90
1311659  5/1987  U.S.S.R. ................................. 460/90

OTHER PUBLICATIONS

Brochure entitled, "New Hydro Row–Crop And Small–Grain Combine," published by John Deere (1990).
Brochure entitled, "Maximizer Combines For Corn and Row Crops" published by John Deere (1993).

Primary Examiner—Terry Lee Melius
Attorney, Agent, or Firm—Emrich & Dithmar

[57] ABSTRACT

A straw walker for an agricultural combine includes a linear, elongated body having a lower, generally horizontal, sieve-like panel and a pair of spaced, generally vertical sidewalls. The upper edge of each of the spaced sidewalls is provided with a plurality of generally V-shaped teeth for agitating a chaff and grain mixture and moving the chaff rearward for discharge from the rear of the combine. Various elements are attached to the upper surface of the straw walker's lower panel for improving the separation of the grain from the chaff. Each of these elements includes at least one elongated, linear blade-like member having a plurality of spaced teeth on an upper edge thereof. Increased spacing of the teeth in the blade-like member allows the chaff and grain mixture along the center of the straw walker to be displaced rearwardly faster than the mixture along the edges of the walker for improved agitation of the mixture and separation of the grain from the chaff as well as faster chaff discharge. Other elements include a pair of spaced, coupled blade-like members each having an upper row of teeth for further reducing the chaff and facilitating its rearward displacement and discharge and improved separation of the grain from the chaff. A stripper plate removes material from a rotating beater disposed aft of the combine's rotating cylinder and forward of the straw walker to prevent backfeeding over the cylinder and to reduce turbulence in the separation stages.

20 Claims, 4 Drawing Sheets

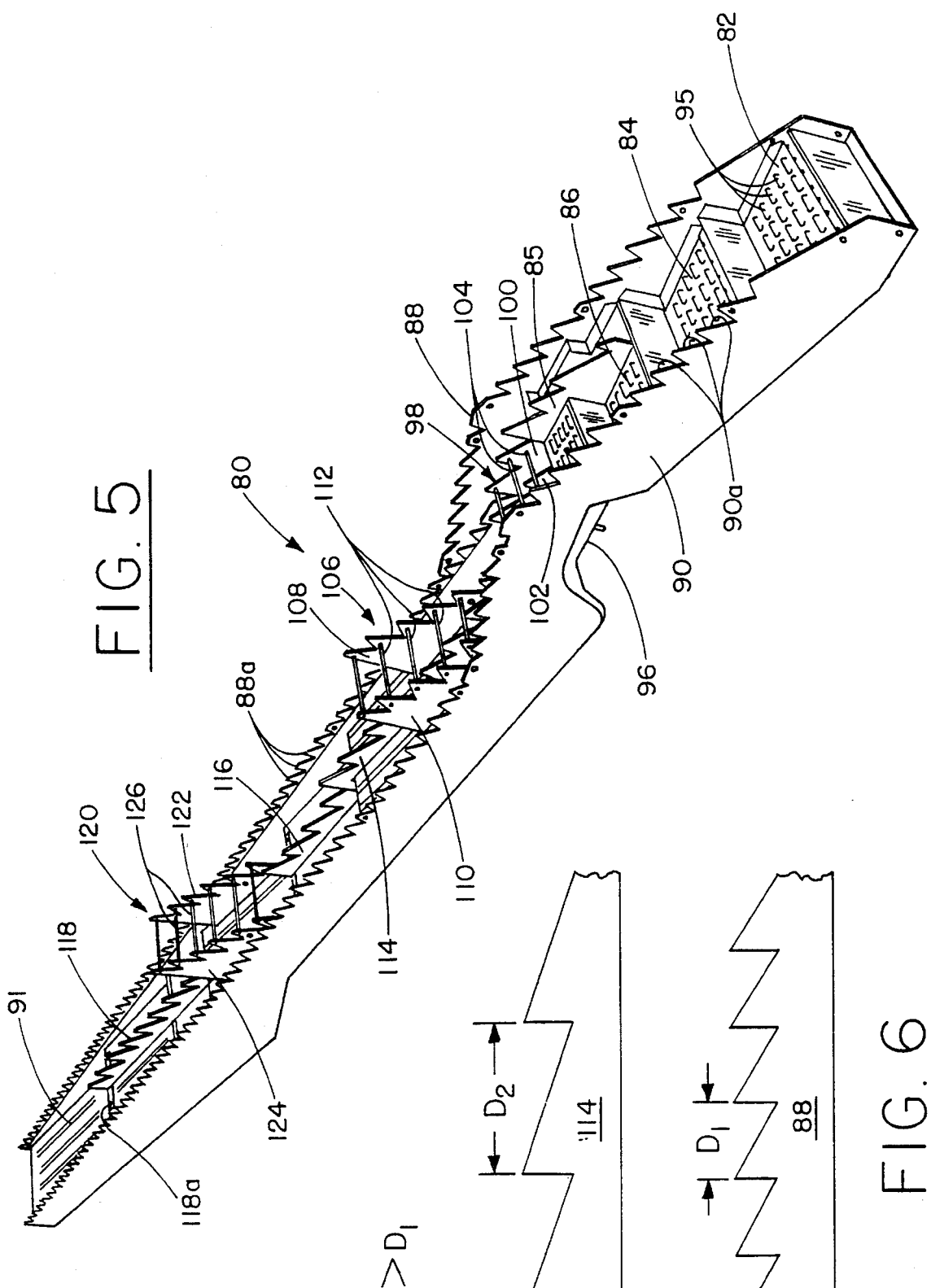

STRAW WALKER FOR CHAFF REMOVAL IN A COMBINE

FIELD OF THE INVENTION

This invention relates generally to the harvesting of grain and is particularly directed to the separation of grain and chaff in a combine.

BACKGROUND OF THE INVENTION

A combine is an agricultural vehicle used in the harvesting of crops. The combine is typically self-propelled and is comprised of a forward header assembly and an aft drive and processing section. The header assembly typically is substantially wider than the aft portion of the combine and includes a plurality of spaced corn or row crop heads which are adapted for engaging the crops and removing the grain therefrom. The thus removed grain, in combination with crop residue such as husks in the case of corn harvesting, is then automatically delivered to the aft drive and processing section of the combine. In addition to housing the source of propulsion, such as a diesel engine and operator controls, the aft portion of the combine also includes a complicated threshing system for further separating the grain from the crop residue and for off-loading the thus separated grain from the combine into a transport vehicle such as a truck. The crop residue is then exhausted from an aft portion of the combine and deposited in the field being harvested.

The threshing system includes many stages for separating the grain from the husk or leafy portion of the plant. An early stage of the threshing system typically includes a rotating cylinder operating in conjunction with a concave structure positioned adjacent to and below the cylinder to initiate grain-crop residue separation. The thus separated grain is then subjected to additional processing for further separation, while the crop residue, or chaff, is exhausted from the combine.

The additional processing to which the grain is subjected typically includes a vibrating sieve arrangement upon which the grain and chaff mixture is deposited by the cylinder. This sieve-like structure, frequently referred to as a "straw walker", agitates the mixture, loosens the grain from the chaff, and moves the chaff to the rear of the combine for discharge into the field while allowing the grain to fall under the influence of gravity to a lower portion of the combine. Because the grain and chaff are frequently discharged from the aforementioned cylinder and concave combination onto the straw walkers in a thick, mat-like mass, this mass must be thoroughly agitated in a rather violent manner to remove the grain from the chaff which tends to ball up into a rather dense mass. The mass of chaff and grain has an even greater density and is more difficult to separate in wet conditions. Failure to separate the grain from the chaff results in the grain also being discharged back onto the field which is, of course, wasteful and inefficient.

The present invention addresses the aforementioned limitations of the prior art by providing a straw walker for separating chaff from grain in a combine which provides increased agitation of the chaff and grain mixture as well as increased speed with which the chaff is moved to the rear of the combine for improved separation of the grain from the chaff.

OBJECTS AND SUMMARY OF THE INVENTION

Accordingly, it is an object of the present invention to provide improved operating reliability and increased grain separating capacity in a combine.

Another object of the present invention is to more efficiently separate grain from the leafy portion of a plant in a combine by reducing crop residue hang-up and backfeed of crop residue following separation of the grain from the leafy portion of the plant.

Yet another object of the present invention is to break up a chaff-grain mat deposited on a reciprocating sieve by moving different portions of the mat at different speeds across the width of the sieve in separating the grain from the chaff.

These and other objects of the present invention are achieved by an apparatus for use in a combine for receiving a mixture of grain and chaff, wherein the apparatus is displaced so as to agitate the mixture of grain and chaff for separating the grain from the chaff. The inventive apparatus comprises an elongated, generally linear, flat bottom panel having a plurality of spaced apertures therein for permitting transit of the grain through the bottom panel during agitation of the grain and chaff mixture; first and second side panels attached to respective, opposed lateral edges of the bottom panel, the first and second side panels respectively having first and second sets of teeth arranged in a spaced manner on an upper edge of the side panel along the length thereof for engaging and moving the mixture of grain and chaff in a rearward direction at a first speed, wherein the spacing between adjacent teeth in the first and second sets of teeth is $D_1$; and an inner panel, mounted to an upper surface of the bottom panel intermediate the first and second side panels and having a third set of teeth disposed in a spaced manner on an upper edge and along the length thereof for engaging and moving the mixture of grain and chaff in a rearward direction at a second speed, wherein the spacing between adjacent teeth in the third set of teeth is $D_2$, where $D_2 > D_1$ and the second speed is greater than the first speed.

BRIEF DESCRIPTION OF THE DRAWINGS

The appended claims set forth those novel features which characterize the invention. However, the invention itself, as well as further objects and advantages thereof, will best be understood by reference to the following detailed description of a preferred embodiment taken in conjunction with the accompanying drawings, where like reference characters identify like elements throughout the various figures, in which:

FIG. 5 is a perspective view of a straw walker vibrating sieve in accordance with the principles of the present invention;

FIG. 6 is a partial side elevation view of an inner panel and a side panel in a straw walker vibrating sieve illustrating the difference in the spacing between adjacent teeth in the two panels in accordance with one aspect of the present invention.

DETAILED DESCRIPTION OF THE PREFERRED EMBODIMENT

Figure 1:
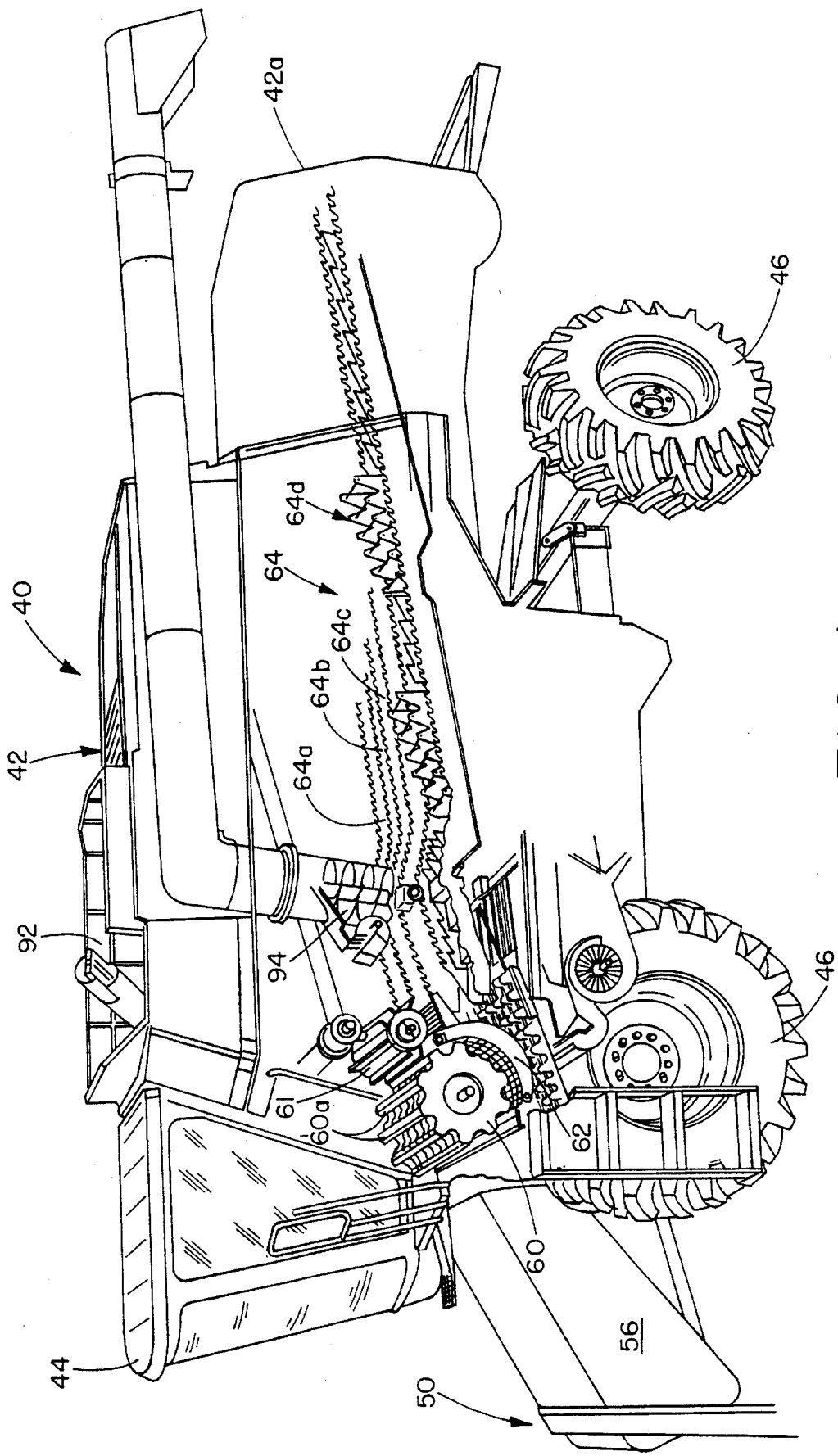
FIG. 1 is a partially cutaway lateral perspective view of a combine incorporating a straw walker arrangement in accordance with the present invention.
Figure 2:
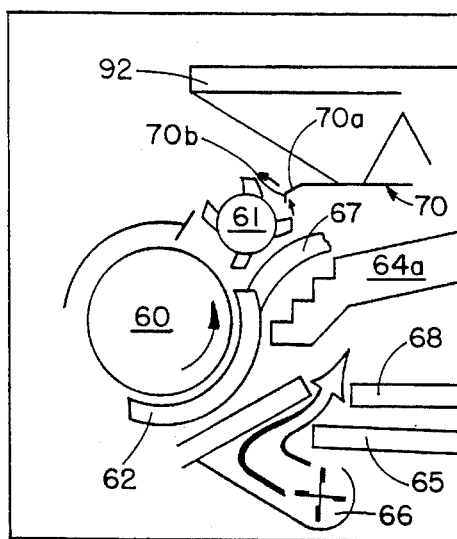
FIG. 2 is a simplified schematic diagram showing the relative position of various components in a combine for separating grain from chaff during the threshing process.
Figure 3:
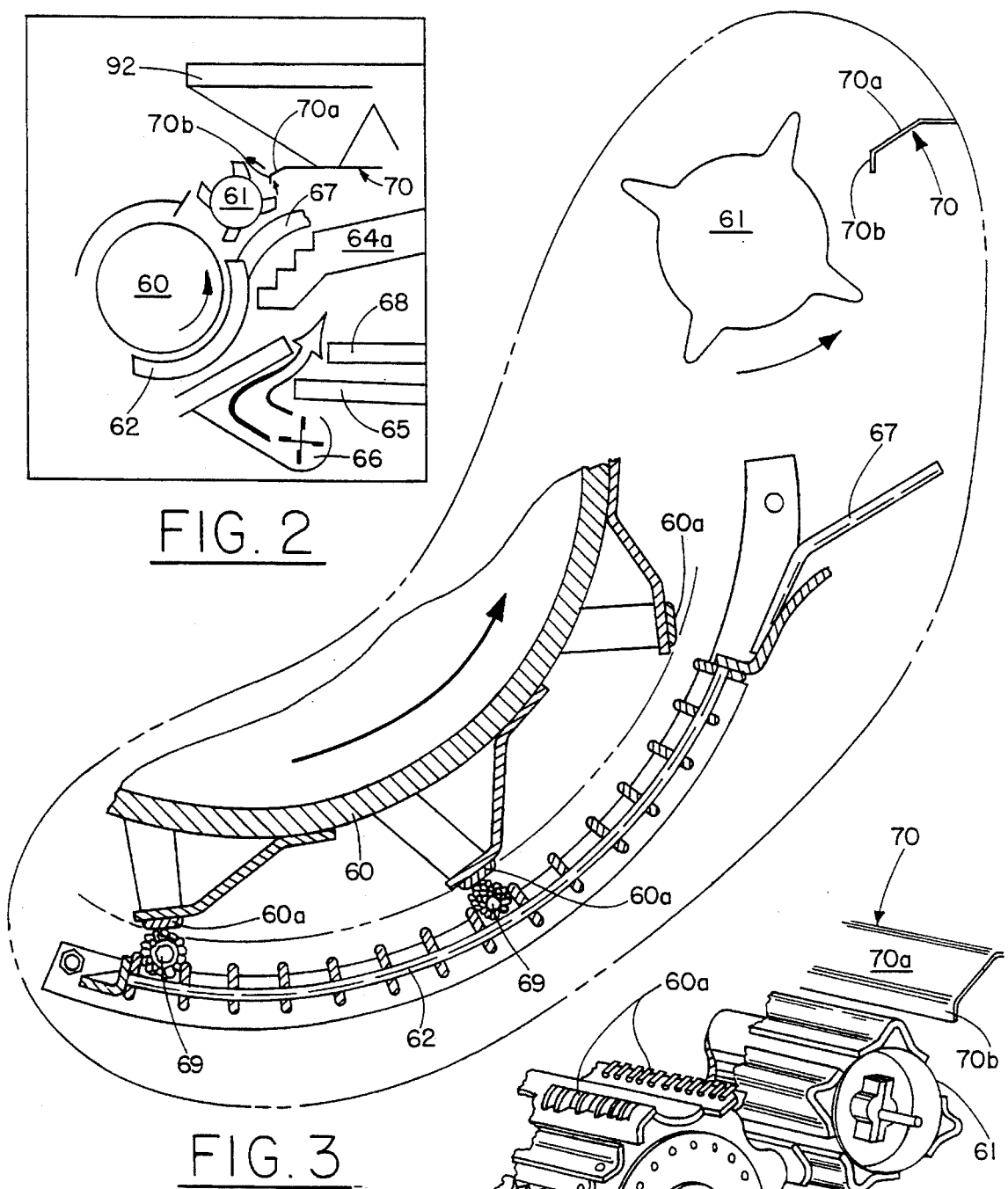
FIG. 3 is a sectional view of a concave, a cylinder, a beater, and a stripper bar arrangement in accordance with one embodiment of the present invention.
Figure 4:
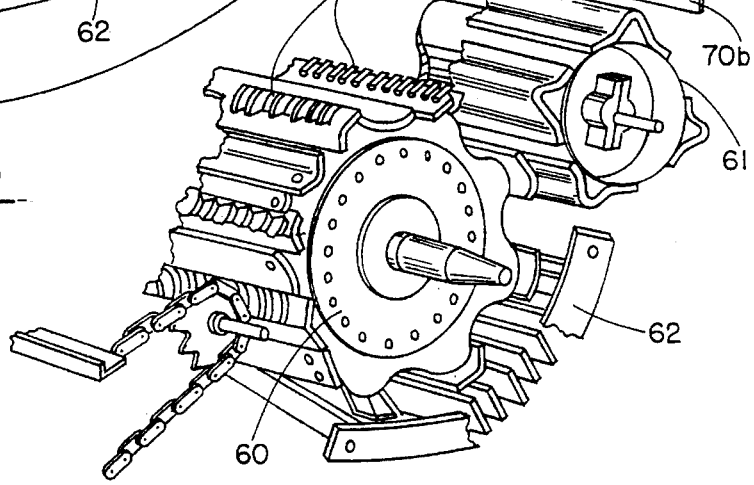
FIG. 4 is a partial perspective view of the concave, cylinder, beater, and stripper plate arrangement shown in FIG. 3.

Referring to FIG. 1, there is shown a partially cutaway perspective view of a combine 40 in which a straw walker assembly 64 in accordance with the present invention is employed. The general operation of combine 40 will now be described in terms of FIG. 1 and FIGS. 2, 3, and 4. FIG. 2 is a simplified schematic diagram of the primary threshing components of the combine, while FIGS. 3 and 4 are respectively lateral sectional and perspective views of combine components employed in the early stages of the process for separating the grain from the chaff, or crop residue.

Combine 40 is comprised primarily of an aft separator/drive section 42 and a forward header assembly 50 attached to a forward portion of the separator/drive section. The separator/drive section 42 includes a cab 44 in which an operator sits and in which are positioned various operating controls for the combine. The separator/drive section 42 effects separation of the grain from the crop residue and includes a plurality of wheels 46 as well as a means for propulsion (typically a diesel engine which is not shown for simplicity) for moving the combine 40 through a field in harvesting the crops. The separator/drive section 42 includes an aft or exhaust end 42a from which the crop residue, after the grain is separated therefrom, is exhausted from the combine 40 and deposited in the field being harvested.

The header assembly 50 mounted to a forward portion of the separator/drive section 42 is wider than the separator/drive section and includes a plurality of spaced head units extending along the length thereof, which are omitted from the figures for simplicity. The header assembly 50 may be provided with a plurality of spaced row crop heads along the length thereof for harvesting corn, soybeans, wheat, milo or rice. The corn heads are adapted to separate and remove the ears of corn from the plant stalk. The grain and the plant residue are then delivered to an aft portion of the header assembly 50 and are directed to the center thereof by means of a left- and right-hand spiraled auger (also not shown for simplicity). From the center, aft portion of the header assembly 50, the grain and residue mixture is delivered to a feeder house 56 which transports the mixture via a conveyor to the combination of a rotating cylinder drum 60 and a concave screen 62. The cylinder drum 60 includes a plurality of spaced raspbars 60a extending along the length and spaced around the periphery thereof. Rotation of the cylinder drum 60 causes the raspbars 60a to engage the corn husks 69 and separate the cob from the leafy portion of the plant. A beater 61 having a plurality of spaced wings disposed about its periphery is typically positioned immediately aft of the cylinder drum 60 and concave screen 62 combination for further carrying out the separation process. A finger grate 67 attached to an upper, aft portion of the concave screen 62 provides support for the crop residue as it is displaced rearward by the beater 61. The beater deposits the reduced mixture upon an elongated walker assembly 64 in accordance with the present invention which is comprised of a plurality of vibrating sieves 64a–64d. The vibrating sieves 64a–64d are aligned lengthwise along a substantial portion of the length of the combine's separator/drive section 42 and are arranged in a closely spaced manner. Each of the sieves 64a–64d is vibrated in a reciprocating, circular manner along the length thereof as described below. The separated grain is allowed to fall through the vibrating sieves 64a–64d of the walker assembly 64, while the unwanted plant residue is retained on an upper portion of the walker assembly and displaced toward the rear of the combine. The thus separated grain which falls through the vibrating sieves of the walker assembly 64 is deposited upon a cleaning shoe 68, also known as a "chaffer," positioned below the walker assembly and comprised of a grate structure for further separating the grain from any crop residue remaining in the mixture. As the grain and residue mixture falls upon the cleaning shoe 68, a blower, or fan, 66 directs a high velocity air flow upward through the apertures in the cleaning shoe and onto the falling mixture to remove chaff therefrom. The chaff and other crop residue removed from the mixture in the earlier separation steps is discharged from the aft or exhaust end 42a of the combine 40. The thus cleaned grain then passes through an apertured sieve 65 and collects in a lower portion of the separator drive section 42 of the combine and is laterally displaced by means of a rotating clean grain auger (not shown) to a center portion of the combine.

The clean grain auger is coupled to and continuous with a generally vertically oriented grain elevator. The grain elevator typically includes a housing within which is positioned a plurality of paddles attached to a moving endless chain. The grain elevator lifts individual portions of grain upward where the grain is then displaced by a loading auger into a storage bin or tank 92. One end of an off-loading grain drill 94 may be positioned within the storage tank 92 for removing the grain positioned therein from the combine 40.

Referring specifically to FIGS. 2 and 3, there is shown a beater stripper plate 70 disposed slightly aft of and generally above beater 61 and above vibrating sieve 64a. As the rotating cylinder 60 rotates in a counter-clockwise direction as shown in FIGS. 2 & 3, the crop material ingested by the combine is displaced rearward and upward between the rotating cylinder and the fixed concave screen 62. The crop material is discharged from the gap between the rotating cylinder 60 and concave screen 62 and is moved rearwardly by means of beater 61. This reduces backfeed of the crop material back onto the rotating cylinder 60. As beater 61 removes the crop material from between the rotating cylinder 60 and fixed concave screen 62, the crop material is displaced by the beater onto a finger grate 67 from which the crop material is discharged onto a plurality of straw walker vibrating sieves where one of the sieves is shown as element 64a in FIG. 2. Disposed aft of and slightly above beater 61 and extending substantially across the entire width of the threshing section of the combine is a beater stripper plate 70. Stripper plate 70 is preferably comprised of a high strength material such as steel and includes an angled intermediate section 70a and a downturned edge 70b, both extending the entire width of the stripper plate 70. Stripper plate 70 is mounted to the facing sidewalls of the combine's threshing section, which are not shown in the figures, and may be further mounted to a lower portion of the combine's grain storage bin 92.

Stripper plate 70 is configured and positioned so as to remove material from the counter-clockwise rotating beater 61 and deposit the material upon the straw walker vibrating sieve 64a. Stripper plate 70 thus prevents backfeeding of crop material back onto either the beater 61 or rotating cylinder 60 and ensures that the material removed from the beater is deposited upon the straw walker assembly which includes vibrating sieve 64a for further processing.

Referring to FIG. 5, there is shown an upper perspective view of a straw walker vibrating sieve 80 in accordance with the present invention. Vibrating sieve 80 has an elongated, generally linear configuration and is aligned lengthwise along the direction of travel of the combine. Vibrating sieve 80 includes a bottom panel 91 and first and second side panels 88 and 90 securely attached to opposed edges of the bottom panel. The bottom panel 91 and side panels 88, 90 are preferably comprised of a high strength steel and are connected by conventional means such as weldments and/or rivets or bolts. The leading end of the bottom panel 91 is provided with first, second, and third steps, 82, 84, and 86. Disposed over the third step 86 is a sawtooth shaped, flat panel 85. Each of the aforementioned steps 82, 84, and 86 as well as the aft portion of the bottom panel 91 is provided with a large number of apertures such as shown for apertures 95 in first step 82 in the figure. The apertures within the bottom panel 91 allow for grain in the chaff and grain mixture agitated by the straw walker vibrating sieve 80 to fall under the influence of gravity through the sieve for separation from the chaff. Each of the first and second side panels 88 and 90 includes a large number of spaced teeth 88a and 90a, respectively, along the length thereof for engaging the grain and chaff mixture as the vibrating sieve 80 is displaced in a reciprocating manner in agitating the mixture, separating the grain from the chaff, and moving the chaff toward an aft end of the vibrating sieve. A plurality of vibrating sieves 80, on the order of four or five, are typically disposed in the combine in a closely spaced, side-by-side manner for threshing large volumes of the grain and chaff mixture.

Disposed aft of the grate-like structure 85 and attached to bottom panel 91 is a first riser, or agitator, 98. Proceeding rearwardly on the straw walker vibrating sieve 80, second and third risers 106 and 120 are also attached to an upper surface of the vibrating sieve's bottom panel 91. First riser 98 includes first and second inner panels 100 and 102, each having a plurality of spaced teeth along an upper edge thereof. The first and second inner panels 100, 102 are attached to an upper surface of bottom panel 91 by conventional means such as nut-and-bolt combinations (not shown for simplicity). The first and second inner panels 100, 102 are further coupled together along respective upper portions thereof by a plurality of connecting rods 104. Similarly, second riser 106 includes a pair of spaced, generally planar inner panels 108 and 110 which are disposed in a spaced manner inwardly from the first and second side panels 88 and 90 and are also mounted to the upper surface of the vibrating sieve's bottom panel 91. The first and second inner panels 108, 110 of the second riser 106 are also coupled together by means of a plurality of spaced connecting rods 112. Each of the first and second inner panels 108, 110 of the second riser 106 are also provided with a plurality of spaced teeth on an upper edge thereof. Also disposed on an upper surface of the straw walker vibrating sieve 80 and mounted to its bottom panel 91, is a third riser 120. The third riser 120 also includes first and second inner panels 122 and 124 which each include a respective plurality of spaced teeth on an upper edge thereof and are coupled together by means of a plurality of spaced connecting rods 126.

The first, second, and third risers 98, 106, and 120 engage the grain and chaff mixture, raise it above the adjacent upper edges of the first and second side panels 88 and 90 while rotating the thus engaged portion of the grain and chaff mixture for more thoroughly agitating the mixture and separating the grain from the chaff. The teeth on the upper edges of each of the inner panels of each of the first, second, and third risers 98, 106, and 120 engage that portion of the grain and chaff mixture above the bottom panel 91 and separate it from adjacent portions of the mixture disposed above the first and second side panels 88 and 90. This shearing effect further reduces the chaff to facilitate its rearward displacement by the sets of teeth on the upper edges of the outer panels. The connecting rods coupling each pair of inner panels in the first, second, and third risers 98, 106 and 120 increase the structural integrity of each of the risers while providing support for those portions of the grain and chaff mixture disposed intermediate the inner panels of each of the risers for more efficient rearward transport of the chaff. The spacing between adjacent teeth on each of the inner panels of the first, second, and third risers 98, 106, and 120 may be greater than the spacing between adjacent teeth on the first and second outer panels 88 and 90 for moving the chaff located above the inner portion of the bottom panel 91 rearwardly faster than the chaff is moved rearwardly by the respective sets of teeth on the outer panels. This further loosens and reduces the grain and chaff mixture for more effective separation of the grain and for faster displacement of the chaff to the rear of the straw walker vibrating sieve 80 for discharge from the combine.

Also disposed along the length of the vibrating sieve's bottom panel 91 in a spaced manner are first, second, and third inner panels 114, 116, and 118. Each of these inner panels is disposed intermediate the first and second side panels 88, 90 and generally along the centerline of the sieve's bottom panel 91. Each of the first, second, and third inner panels 114, 116, and 118 also includes a plurality of spaced teeth generally in the shape of inverted "V"s on its upper edge portion. The spacing between the teeth in the first, second, and third inner panels 114, 116, and 118 is greater than the spacing between the teeth of the first and second side panels 88, 90 as shown in FIG. 6, which is a simplified side elevation view of a portion of the first inner panel 114 and the first side panel 88. As shown in the figure, the spacing between adjacent teeth in the first inner panel 114 is $D_2$, while the spacing between adjacent teeth in the first side panel 88 is $D_1$, where $D_2 > D_1$, for moving the chaff in the center of the bottom panel 91 rearwardly faster than the chaff is moved rearwardly by the sieve's side panels. In a preferred embodiment, $D_2 = 2D_1$.

Figure 7:
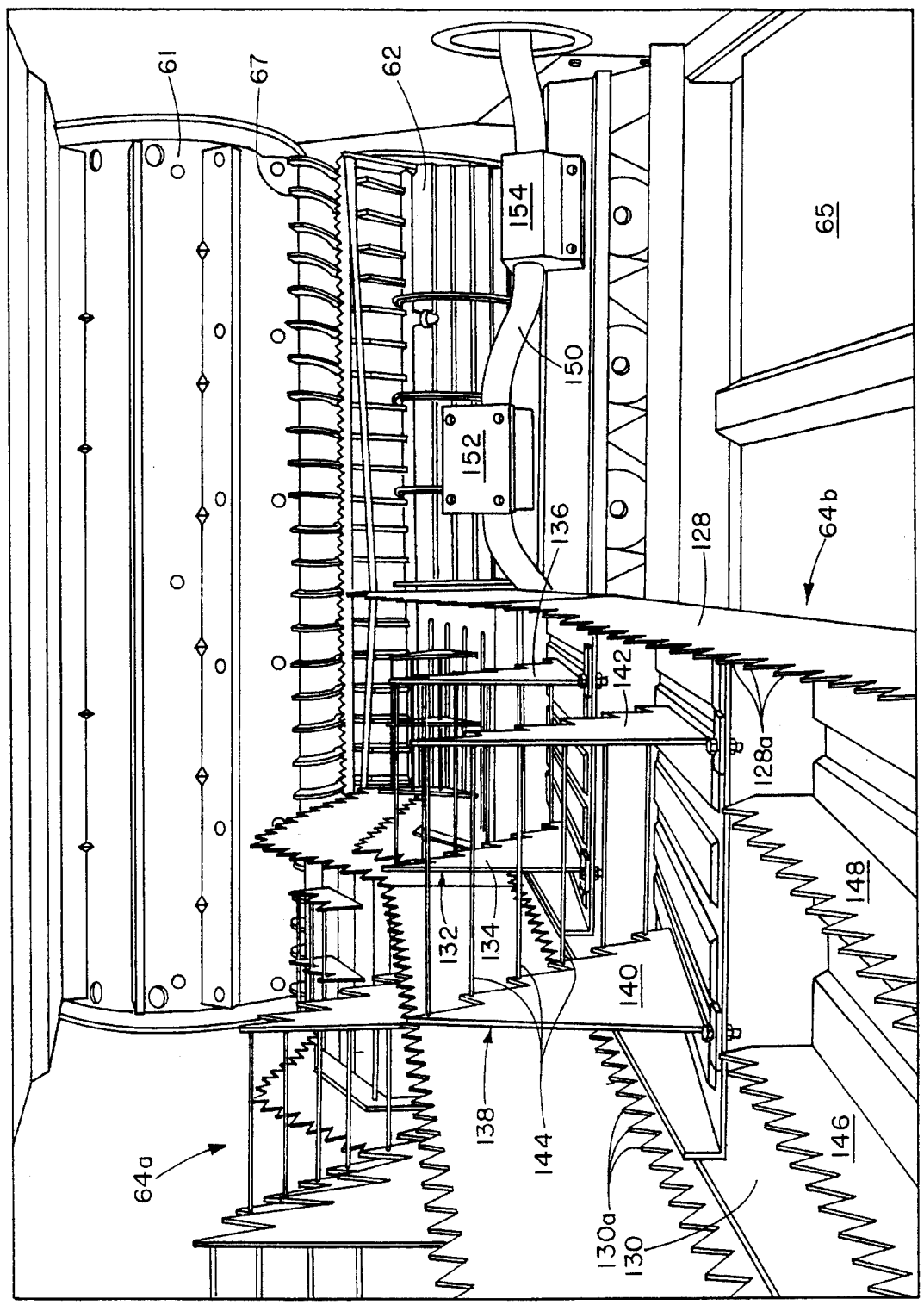
FIG. 7 is a perspective view of an inner portion of a combine looking forward, illustrating the position of several straw walker vibrating sieves in accordance with the present invention within the combine.

Referring to FIG. 7, there is shown a perspective view of an inner portion of a combine incorporating a plurality of straw walker vibrating sieves in accordance with the present invention. Shown in the figure are two vibrating sieves 64a and 64b. The two remaining sieves are not shown in the figure for simplicity, but, if present, would be attached to first and second mounting brackets 152 and 154 respectively. The first and second mounting brackets 152, 154 are rotationally coupled to a non-linear bearing crank 150 which is displaced in a rotating manner so as to oscillate each of the vibrating sieves in a generally circular motion along the length of the vibrating sieve. As shown in the figure, vibrating sieve 64a is in an upraised position while vibrating sieve 64b is in a lowered position established by the non-linear shape of the bearing crank 150. Each of the vibrating sieves is displaced in an alternating, upraised and lowered manner as the grain and chaff mixture is displaced rearwardly within the combine by means of the combination of the rotating cylinder (not shown for simplicity), concave screen 62, finger grate 67, and the rotating beater 61. As shown in the figure, vibrating sieve 64b includes first and second side panels 128 and 130 having respective pluralities of teeth 128a and 130a on their upper edges. Vibrating sieve 128 further includes first and second risers 132 and 138, where the first riser includes inner panels 134 and 136 and the second riser includes inner panels 140 and 142. The inner panels are coupled by means of a plurality of spaced connecting rods 144. Disposed aft of the second riser 138 and arranged in a spaced manner on the vibrating sieve's bottom panel are third and fourth inner panels 146 and 148, each having an upper edge with a respective plurality of teeth, wherein the spacing between adjacent teeth is greater than the spacing between the teeth 128a and 130a on the first and second side panels 128, 130. The first and second risers 132, 138, and the third and fourth inner panels 146, 148 more thoroughly reduce the chaff to facilitate its separation from the grain and displace it along vibrating sieve 64b. The chaff is moved along the center of the sieve's bottom panel faster than the chaff is moved by its side panels for more efficient discharge of the chaff from the combine. A fixed sieve 65 is shown disposed below the vibrating sieves 64a and 64b as also shown in FIG. 2 and described above.

There has thus been shown a vibrating sieve for use in a combine straw walker for separating grain from chaff having an apertured, generally horizontal bottom panel and a pair of outer panels, each having a plurality of spaced teeth on an upper edge and along the length thereof. The vibrating sieve further includes one or more inner panels disposed between the two outer panels and also provided with a set of spaced teeth on an upper edge thereof. The spacing between the teeth on the inner panel is greater than the spacing between the teeth on the two side panels in one embodiment for moving the chaff rearwardly faster along an inner portion of the sieve than along the outer edges of the sieve. This effect reduces the chaff to facilitate its rearward transport and more thoroughly mixes the grain and chaff mixture for more efficient separation of the grain from the chaff. This arrangement also allows for the more rapid processing of the grain and chaff mixture by the combine. The inner panel, or panels, may also be inclined in proceeding from front to rear on the vibrating sieve for raising the grain and chaff mixture on an inner portion of the sieve relative to that on the outer portions of the sieve for also reducing the chaff and more thoroughly mixing the grain and chaff for more efficient separation of the grain from the chaff.

Having thus disclosed in detail a preferred embodiment of the invention, persons skilled in the art will be able to modify certain of the structure which has been illustrated and to substitute equivalent elements for those disclosed while continuing to practice the principle of the invention; and it is, therefore, intended that all such modifications and substitutions be covered as they are embraced within the spirit and scope of the appended claims.

I claim:

1. Apparatus for use in a combine for receiving a mixture of grain and chaff, wherein said apparatus is displaced so as to agitate the mixture of grain and chaff for separating the grain from the chaff, said apparatus comprising:

an elongated, generally linear, flat bottom panel having a plurality of spaced apertures therein for supporting the chaff while permitting transit of the grain through said apertures during agitation of the grain and chaff mixture;

first and second side panels attached to respective, opposed lateral edges of said bottom panel, said first and second side panels respectively including first and second sets of teeth arranged in a spaced manner on a respective upper edge of the side panel along the length thereof for engaging and moving the mixture of grain and chaff in a rearward direction at a first speed, wherein the spacing between adjacent teeth in the first and second sets of teeth is $D_1$; and a first inner panel, mounted to an upper surface of said bottom panel intermediate said first and second side panels and having a third set of teeth disposed in a spaced manner on an upper edge and along the length thereof for engaging and moving the mixture of grain and chaff in a rearward direction at a second speed, wherein the spacing between adjacent teeth in said third set of teeth is $D_2$, where $D_2 > D_1$ and said second speed is greater than said first speed.

2. The apparatus of claim 1 further comprising a plurality of inner panels mounted to and disposed in a spaced manner along the length of said bottom panel.

3. The apparatus of claim 1 wherein the upper edge of said inner panel is inclined, increasing in height above said bottom panel in proceeding from a forward portion to a rear portion of said bottom panel.

4. The apparatus of claim 3 wherein each of said teeth is generally in the shape of an inverted "V" and wherein the upper edges of said side panels and said inner panel are generally sawtooth-shaped.

5. The apparatus of claim 1 wherein $D_2$ is on the order of $2D_1$.

6. The apparatus of claim 1 wherein said bottom panel includes a front end portion having a plurality of steps arranged in a spaced manner along the length thereof, and wherein said inner panel is mounted to and disposed adjacent to one or more of said steps.

7. The apparatus of claim 1 wherein said inner panel comprises an elongated, linear, generally planar member aligned lengthwise along said bottom panel.

8. The apparatus of claim 1 further comprising mounting means for securely attaching said inner panel to said bottom panel.

9. The apparatus of claim 8 wherein said mounting means includes a plurality of nut and bolt combinations.

10. The apparatus of claim 1 further comprising second and third inner panels mounted in a spaced, side-by-side manner on an upper surface of said bottom panel intermediate said first and second side panels and disposed in a spaced manner along the length of said bottom panel from said first inner panel, said second and third inner panels respectively including first and second sets of teeth arranged in a spaced manner along a respective upper edge of the inner panel along the length thereof for engaging and moving the mixture of grain and chaff in a rearward direction, wherein the teeth on the upper edges of said second and third inner panels engage, turn over, and move rearwardly the grain and chaff mixture intermediate said first and second side panels.

11. The apparatus of claim 10 further comprising coupling means attached to adjacent portions of said second and third inner panels for securely connecting said second and third inner panels.

12. Apparatus for use in a combine for receiving a mixture of grain and chaff, wherein said apparatus is displaced so as to agitate the mixture of grain and chaff for separating the grain from the chaff, said apparatus comprising:

an elongated, generally linear, flat bottom panel having a plurality of spaced apertures therein for supporting the chaff while permitting transit of the grain through said apertures during agitation of the grain and chaff mixture;

first and second side panels attached to respective, opposed lateral edges of said bottom panel, said first and second side panels respectively including first and second sets of teeth arranged in a spaced manner on a respective upper edge of the side panel along the length thereof for engaging and moving the mixture of grain and chaff in a rearward direction at a first speed, wherein the spacing between adjacent teeth in said first and second sets of teeth is $D_1$; and first and second inner panels mounted in a spaced manner to an upper surface of said bottom panel intermediate said first and second side panels and respectively having a third and fourth sets of teeth disposed in a spaced manner on an upper edge and along the length thereof, wherein the spacing between adjacent teeth in said third and fourth sets of teeth is $D_2$, where $D_2 > D_1$, and wherein said third and fourth sets of teeth engage and move the mixture of grain and chaff in a rearward direction at a second speed, wherein said second speed is greater than said first speed, and wherein said first and second inner panels are disposed adjacent and side-by-side one another on said bottom panel, and wherein said first and second inner panels extend higher than said first and second side panels above said bottom panel.

13. The apparatus of claim 12 further comprising coupling means attached to respective upper portions of said first and second inner panels for securely connecting said inner panels, wherein the teeth on the upper edges of said inner panels engage, turn over, and move rearwardly the grain and chaff mixture intermediate said first and second side panels.

14. The apparatus of claim 13 wherein said coupling means includes at least one connecting rod coupled at respective ends to said first and second inner panels.

15. The apparatus of claim 12 further comprising connecting means for mounting said first and second inner panels to said bottom panel.

16. The apparatus of claim 15 wherein said connecting means includes a plurality of nut and bolt combinations.

17. The apparatus of claim 12 wherein the upper edges of said first and second inner panels are inclined, increasing in height above said bottom panel in proceeding from a forward portion to a rear portion of said bottom panel.

18. The apparatus of claim 17 wherein each of said teeth is generally in the shape of an inverted "V" and wherein the upper edges of said side panels and said inner panel are generally sawtooth-shaped.

19. The apparatus of claim 12 wherein $D_2$ is on the order of $2D_1$.

20. The apparatus of claim 12 wherein each of said inner panels is comprised of an elongated, linear, generally planar member aligned lengthwise along said bottom panel.

* * * * *